Oct. 25, 1960  L. R. MOSKOWITZ  2,957,261
MAGNETIC SIGN FOR VEHICLES AND THE LIKE
Filed July 2, 1958
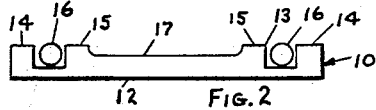
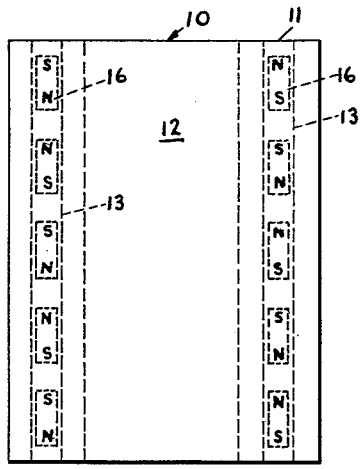
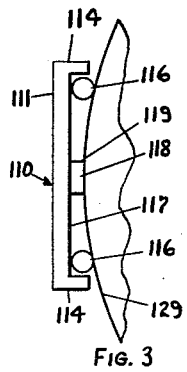
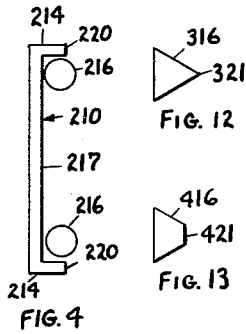
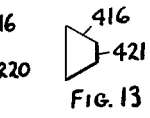
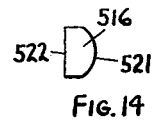
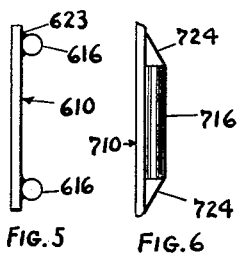
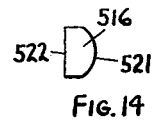
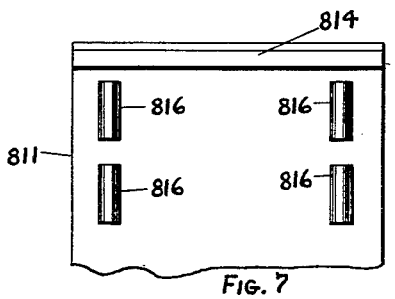
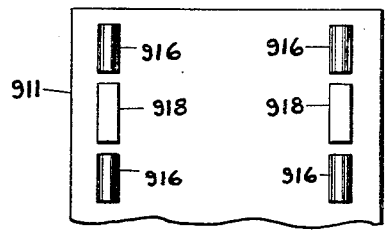
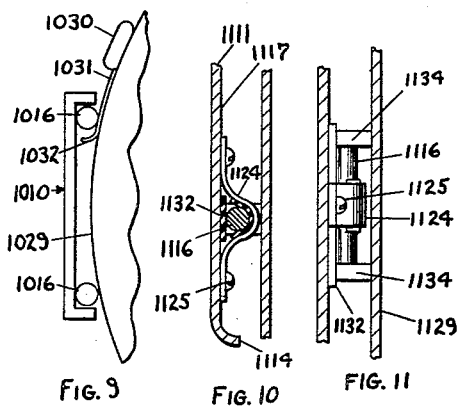
*INVENTOR.*
LESTER R. MOSKOWITZ
BY
Charles L. Loverbeck
*attorney*

United States Patent Office 2,957,261
Patented Oct. 25, 1960

2,957,261

MAGNETIC SIGN FOR VEHICLES AND THE LIKE

Lester R. Moskowitz, Erie, Pa., assignor to Zeta-Northern Co., Erie, Pa., a corporation of Pennsylvania Filed July 2, 1958, Ser. No. 746,157

3 Claims. (Cl. 40—129)

This invention relates to signs and, more particularly, to signs having magnetic supporting means thereon.

Signs according to previous designs used for attaching to magnetic parts on vehicles and other similar objects were previously made in such a manner that they would not adhere efficiently to the magnetic surfaces because of the inefficient manner in which the magnets and magnetic flux paths were designed and, therefore, the manner in which the magnetic fields were applied. Further, previous signs were designed in such a manner that they were inclined to slip on the supporting surfaces and, therefore, become detached from the said surfaces.

It is, accordingly, an object of this invention to overcome the disadvantages and defects in previous signs and, more particularly, it is an object to provide a sign which is simple in construction, economical to manufacture, and simple and efficient to use.

Another object of the invention is to provide a sign for use on vehicles having an improved means thereon for preventing the sign from slipping.

A further object of this invention is to provide an improved magnetic attaching means for a vehicular sign.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a top view of a sign according to the invention;

Fig. 2 is an end view of the sign shown in Fig. 1;

Fig. 3 shows another sign supported on a vehicle; and

Figs. 4 to 14 inclusive show further embodiments of the invention.

Now with more specific reference to the drawing, a sign is shown for use on vehicles and on other environments where a magnetic surface is available to attach the sign. In the embodiment of the invention shown in Figs. 1 and 2, a sign 10 is disclosed having a plate like body portion 11, preferably with a flat top surface 12. The sign 10 may be made of molded plastic, die casting, or it could be fabricated from sheet metal, wood, or the like and is made of non-magnetic material.

Spaced slots 13 are formed in a bottom surface 17 of the body portion 11. The slots 13 extend generally parallel to each other and are defined by outwardly disposed flanges 14 and inner flanges 15 which define the slots 13.

Permanent magnetic members 16 are disposed in the slots 13 attached therein by soldering, brazing, or cementing and are spaced from each other and disposed in two generally parallel rows. It will be noted that the diameter of the magnetic members 16 is slightly greater than the depth of the slots 13 so that the bottom surface of each magnet 16 extends slightly below the lower surfaces of the flanges 14 and 15. Thus, the magnet 16 itself will engage the metallic supporting surface and leave little or no air gap and, therefore, provide an efficient path for the flow of magnetic flux through the magnet 16 and into the magnetic material of the supporting surface.

The magnets 16 will be so arranged that like poles thereof are disposed adjacent each other as indicated so that separate magnetic fields will be formed by each magnetic member 16 and, therefore, each individual field will pass through the magnetic supporting surface because of the arrangement of the poles of the magnets 16. It will also be noted that the magnets 16 on one side of the sign 10 have the pole at the end of the sign 10 of opposite polarity to the corresponding pole on the magnet 16 on the opposite end. This is done because when the signs 10 are stacked for shipping purposes, if the poles were arranged so that like poles were stacked on top of each other, a strong demagnetizing effect would result and the magnets 16 would be weakened in a very short time during shipment and storage. By having the polarity of the magnets on opposite sides of the sign 10 as shown, the magnets 16 will not demagnetize each other. The surface 12 has indicia thereon by way of advertising matter.

In the embodiment of the invention shown in Fig. 3, a simple channel shaped member 110 having outboard flanges 114 thereon is shown. Magnets 116 are held in place in the corner between the flanges 114 and a lower surface 117 of a body 111 by soldering, brazing, plastic cement, or the like.

A frictional member 118 made of rubber, plastic, or some material having a high coefficient of friction with respect to metal is disposed and attached by bonding or cementing to the lower surface 117 of the body 111. A lower surface 119 of the frictional member 118 is slightly thicker than the diameter of the magnets 116 so that it extends outwardly below the outer surface of the magnets 116. Therefore, the force of the magnets 116 compresses the member 118 and causes a frictional force to develop between the frictional member 118 and the surface 119 of the device on which it is supported. This prevents the sign from slipping on the supporting surface. By designing the thickness of the frictional member 118 for the proper thickness, the sign can be used on a convex surface such as surface 129 shown.

The embodiment shown in Fig. 4 shows a body member 210 with spaced outboard flanges 214 and magnets 216 fastened in place between the flanges 214 and a bottom surface 217 of the body member 210. The bottom surface 217 of the magnet 216 extends below a lower surface 220 of the flanges 214 and, therefore, the magnets 216 will engage the surface of the supporting body rather than the surface of the flanges engaging the supporting surface and since there is an unobstructed space between the magnets 216, the device can be supported on a curved surface without the upwardly extending portions of the curved surface interfering with the operation of the magnets 216 or the sign.

In Fig. 5, another embodiment of the invention is shown wherein a plate like member 610 forms the body of the magnet and cylindrical magnets 616 are attached thereto by soldering, welding, or brazing at 623. For certain applications, this form of sign body has advantages over that shown in Figs. 1 and 2 and the other embodiments.

In the embodiment shown in Fig. 6, cylindrical magnets 716 are attached to a body 710 by soldering, brazing, or cementing and the end portions adjacent the ends of the magnets 716 are filled with cement, solder, or other attaching material 724 which forms a tapered pole piece at each end of the magnets 716 to conduct the flux from the magnets 716 to the body on which the sign is to be supported. Therefore, a more efficient supporting structure is provided.

In the embodiment of the invention shown in Fig. 7, a body portion 811 is shown having spaced magnets 816 disposel in parallel spaced relation in two rows on opposite sides of the sign disposed laterally of flanges 814 similar to the flanges shown in Figs. 1 and 2. This arrangement of magnets with relation to the flanges 814 makes a more efficient structure in certain applications and makes the device more suitable for attaching to a curved surface.

A body portion 911 is shown in the embodiment shown in Fig. 8 and has spaced cylindrical magnets 916 attached thereto by soldering, brazing, cementing, or other suitable fastening means or the magnets 916 could be molded into the material at the time of molding if the sign were made of plastic.

Frictional members 918 are supported between the magnets 916. The frictional members 918 extend outwardly from the magnets 916 a slight distance so that the force on the magnets 916 pulling the body portion 911 toward the supporting surface will compress the frictional members 918 between the body of the sign and the supporting surface and, therefore, cause a considerable frictional force between the magnets 916 and the supporting surface, preventing the sign from slipping.

In the embodiment shown in Fig. 9, a sign similar to that shown in Fig. 4 is shown; however, a body 1010 is shown supported on a curved surface 1029 of an automobile body or the like. The surface 1029 will be made of magnetic material and a chromium plated decorative strip 1030 is shown supported or attached to the body or surface 1029. A clip 1031 will be slid between the decorative strip 1030 and the surface 1029. The clip 1031 will have an outwardly extending end 1032 which will underlie magnets 1016. The clip 1031 will itself be made of magnetic material and it will serve the dual function of forming a pole piece on an armature for the permanent magnets 1016 and, at the same time, will prevent the sign from sliding laterally on the supporting surface.

In the embodiment of the invention shown in Figs. 10 and 11, a body member 1111 is made generally of a plate having the ends thereof turned downwardly at 1114 to form flanges generally similar to the flanges 14 shown in the embodiment in Fig. 1. The device has a flat inner surface 1117 on which is attached permanent magnets 1116. The magnets 1116 are held in place by means of U-shaped brackets 1124 which have a screw 1125 in each end thereof. A resilient compressible material 1132 such as rubber or the like is disposed under the permanent magnets 1116 between them and the inner surface 1117 and the material 1132 forms a resilient backing for the magnets 1116 so that they can adjust themselves to the contour of a supporting surface 1129. Pole pieces 1134 are attached to each end of the permanent magnets 1116 and the pole pieces 1134 carry the magnetic flux from the permanent magnets 1116 to the magnetic supporting surface 1129.

The permanent magnets 1116 will be supported in spaced parallel rows similar to the rows of magnets in the other embodiments of the invention and with the resilient material 1132 disposed behind each permanent magnet 1116, the magnets 1116 will be held in a position whereby they can adjust themselves to the variations in contour of the supporting surface 1129.

Figs. 12, 13, and 14 show separate embodiments of magnets 316, 416, and 516, respectively, which may be applied to the sign such as shown in Figs. 1 and 2 or in Figs. 3 or 4. The advantages of these shapes are that in the embodiment shown in Fig. 12, the magnets 316 are wedge shaped in cross section and the sides thereof opposite one hypotenuse of a triangle formed by the cross section of the magnet 316 will be attached to the plate like body of the sign to be supported and a concentration of flux will develop at the crest of the wedge shape at 321 which will positively hold the magnet 316 and the sign in place.

In like manner, in the embodiment shown in Fig. 13, a reduced sized end portion 421 will cause a concentration of the magnetic flux at this point and, in some applications, hold the magnet 416 in place in a more efficient manner than a plain flat or a plain cylindrical magnet.

In the embodiment of the invention shown in Fig. 14, the magnet 516 is generally rectangular in cross section and with the side remote from the support rounded for a more positive flux concentration in some applications because a flat side 522 can be efficiently attached to the body of the sign while a round portion 521 will more efficiently concentrate the flux and, therefore, hold the magnet 516 in position.

The embodiments shown in Figs. 12, 13, and 14 disclose elongated members such as the members 16 shown in Fig. 1. The end views only are shown.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A magnetic sign for supporting on a member having a supporting surface made of magnetic material comprising a plate like member, aligned spaced permanent magnets attached to the side of said plate like member adjacent said supporting surface and adapted to engage said supporting surface, said plate like member being adapted to have indicia on the side thereof opposite said magnets, and resilient compressible members disposed between each said magnet, said resilient members having a high coefficient of friction relative to said supporting surface, said resilient members extending outwardly from said plate like member beyond any other part thereon.

2. A sign comprising a plate like member having a flange on each side thereof, said flanges being parallel to each other, two spaced rows of permanent magnets, each said row of said permanent magnets being attached to said plate like member on the side with said flange and disposed inwardly of one said flange, and a resilient member having a high coefficient of friction relative to said plate like member attached to said plate like member on the same side thereof with said flange, said resilient member extending from said plate like member beyond said flanges and said magnets.

3. A magnetic sign and means for supporting said sign in proximity to a member made of magnetic material comprising a member having a generally flat surface, aligned, spaced permanent magnets attached to said member and adapted to be disposed adjacent said member, a portion of said member being adapted to have indicia supported on the side thereof remote from said member, and resilient compressible members fixed to said sign and adapted to engage a surface adjacent said magnets, said resilient members having a high coefficient of friction relative to said flat surface, said resilient members extending outwardly from said member beyond any other part thereon.

References Cited in the file of this patent
UNITED STATES PATENTS

| | | |
|---|---|---|
| 1,624,741 | Leppke | Apr. 12, 1927 |
| 1,735,883 | Smith | Nov. 19, 1929 |
| 2,659,169 | Brennan | Nov. 17, 1953 |

FOREIGN PATENTS

| | | |
|---|---|---|
| 860,742 | Germany | Dec. 22, 1952 |